United States Patent [19]

Rosa

[11] 4,310,921

[45] Jan. 12, 1982

[54] PEAK-LEVEL DETECTOR FOR DIGITIZED SIGNALS IN PCM TELECOMMUNICATION SYSTEM

[75] Inventor: Nicola Rosa, Albairate, Italy

[73] Assignee: Società Italiana Telecomunicazioni Siemens S.p.A., Milan, Italy

[21] Appl. No.: 131,749

[22] Filed: Mar. 19, 1980

[30] Foreign Application Priority Data

Mar. 20, 1979 [IT] Italy .................. 21131 A/79

[51] Int. Cl.$^3$ .............................................. H04J 3/14
[52] U.S. Cl. ...................................... 370/13; 375/10; 375/114
[58] Field of Search ............... 370/13, 17; 375/10, 375/114, 116; 340/146.2; 371/36

[56] References Cited

U.S. PATENT DOCUMENTS 3,924,078 12/1975 Bussey .................................. 370/13

Primary Examiner—Joseph A. Orsino, Jr.
Attorney, Agent, or Firm—Karl F. Ross

[57] ABSTRACT

In order to determine the maximum level of a coded signal from a selected communication channel appearing in the output of a PCM multiplexer in which bit groups from several such channels are interleaved in a time-division mode, PCM bytes arriving in time slots assigned to the selected channel are fed to a comparator which causes their entry in a primary register if their numerical value exceeds that of a previous entry. After a predetermined number of PCM frames, e.g. 64, a peak-level byte represented by the contents of that primary register is transferred to a first secondary register whereupon the same procedure is repeated two more times with storage of additional peak-level bytes in two other secondary registers. In a fourth operating phase the contents of the three secondary registers are compared and, if identity is established between at least two of the bytes stored there, such a stored byte is delivered to a decoder controlling an oscilloscope to display the detected signal level.

7 Claims, 1 Drawing Figure

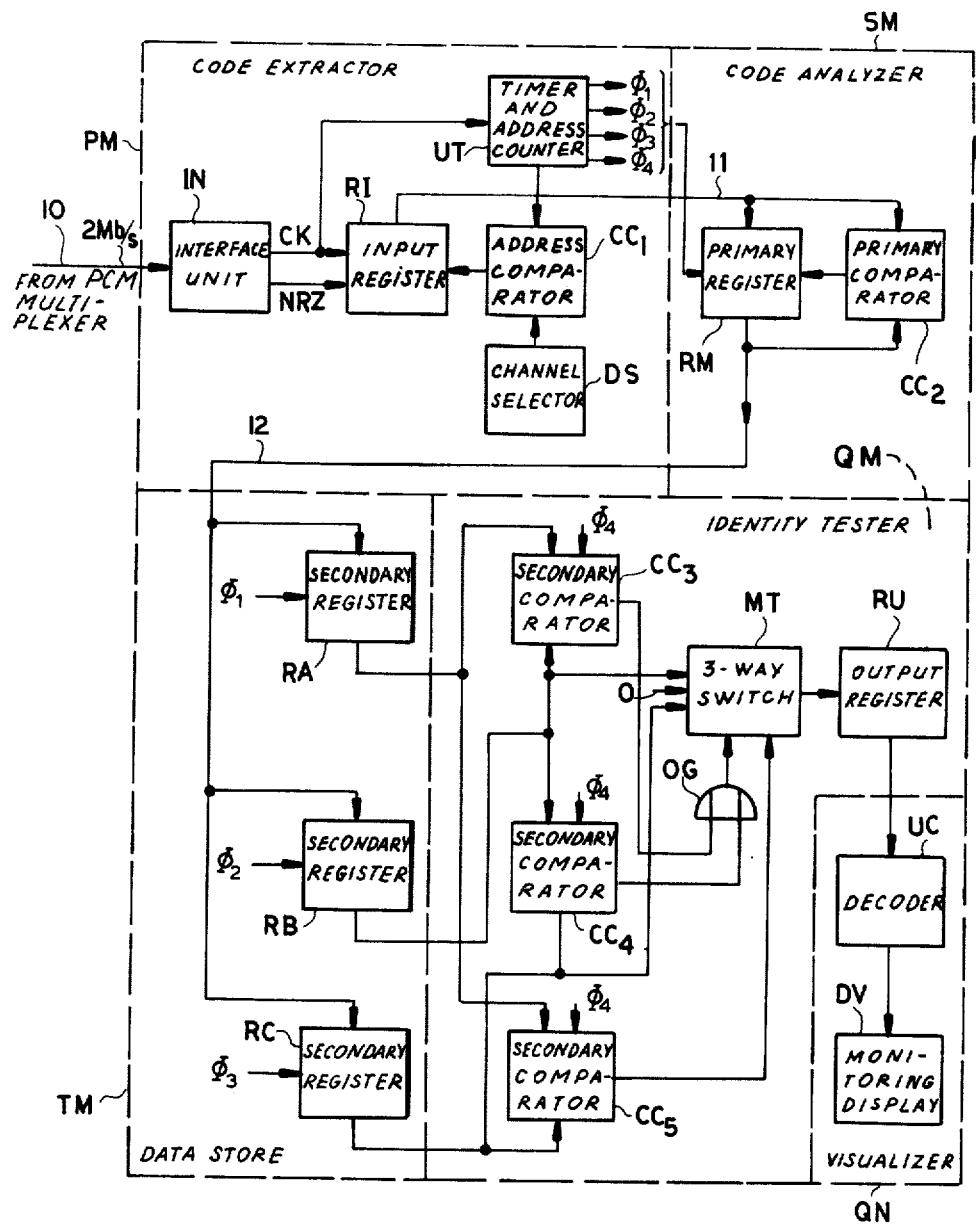

PEAK-LEVEL DETECTOR FOR DIGITIZED SIGNALS IN PCM TELECOMMUNICATION SYSTEM

FIELD OF THE INVENTION

My present invention relates to a circuit arrangement, referred to hereinafter as a peak-level detector, designed to determine the maximum numerical value of a succession of bit groups representing digitized amplitude samples of signals from a communcation channel which is one of a number of such channels whose messages are transmitted in the time-division-multiplex (TDM) mode between two points of a telecommunication system.

BACKGROUND OF THE INVENTION

In such a system, signal samples digitized by pulse-code modulation (PCM) constitute bit groups—known as bytes—which are interleaved by a multiplexer at one TDM terminal in respective time slots of a recurrent data-stream frame, these time slots being individually assigned to the several communication channels whose messages are to travel over a common transmission path to another TDM terminal for redistribution by a demultiplexer and subsequent decoding. The decoded signal amplitudes should, of course, conform as closely as possible to those of the original analog signals; thus, the maximum signal level at the point of origin should always be translated into one and the same bit group yielding again a maximum level upon reconversion to analog form. To test the fidelity of digitization, it is therefore customary to apply a low-frequency signal to predetermined amplitude to the input end of a given channel of a PCM/TDM system and to detect the amplitude of the reconstituted low-frequency signal at the output end of that channel, i.e. after sampling, encoding, multiplexing, transmission, demultiplexing and decoding. Since, however, an error in the equipment of the transmitting terminal may be compensated by a complementary error in the equipment of the receiving terminal, this mode of testing is not a dependable gauge for the performance of the multiplexer and associated circuit components (e.g. binary coder) per se.

OBJECT OF THE INVENTION

The object of my present invention, therefore, is to provide level-detecting means for directly checking the fidelity of a PCM/TDM transmitting terminal without reference to an original analog signal.

SUMMARY OF THE INVENTION

In accordance with my present invention I provide, downstream of a multiplexer forming part of a PCM/TDM terminal, selection means for extracting bit groups from time slots assigned to a given channel in successive frames of an incoming data stream, extracted bit groups being fed to a primary register for temporary storage therein under the control of primary comparison means enabling such storage only when the numerical value of an arriving bit group exceeds that of the current contents of that register. A plurality of secondary registers have normally blocked input connections which extend from the primary register and, upon selective unblocking, enable the transfer of the contents of the latter register to the corresponding secondary register. Such unblocking is performed by a timer which is synchronized with the recurrence period of the PCM frames and, upon counting several series of successive frames, commands the transfer of the bit group last stored in the primary register to one of the secondary registers at the end of each series. In the preferred embodiment, which will be described hereinafter, there are three such secondary registers and the transfer operation is thus completed after three series of frames have been counted. The secondary registers work into inputs of secondary comparison means, consisting of three comparators in the preferred embodiment, for ascertainment of an identity between at least two bit groups stored therein at the end of the last series of counted frames. The numerical value of identical bit groups so stored is transmitted to an evaluator for indication, preferably in visual form with the aid of a display device such as an oscilloscope.

BRIEF DESCRIPTION OF THE DRAWING

The above and other features of my invention will now be described in detail with reference to the accompanying drawing the sole FIGURE of which is a block diagram illustrating a representative embodiment.

SPECIFIC DESCRIPTION

The illustrated peak-level detector is divided into five distinct sections, namely a code extractor PM, a code analyzer SM, a data store TM, an identity tester QM and a visualizer QN.

Code extractor PM comprises an interface unit IN which receives via a line 10, emanating from a PCM multiplexer not shown, a high-frequency data stream of the no-return-to-zero (NRZ) type at an assumed rate of two M bits per second. Unit IN includes a sync extractor generating clock pulses CK which are delivered to a timer UT correlating the operations of the various components with the recurrence period, generally 125 $\mu$sec, of the PCM frames in bit stream NRZ. An input register RI, controlled by clock pulses CK, receives that bit stream from unit IN for briefly storing each arriving bit group or byte; at the rate here assumed, the storage time will be 4 $\mu$sec. Code extractor PM further comprises a channel selector DS which is settable, manually or otherwise, to supply a comparator $CC_1$ with the address of a communication channel whose digitized signal level is to be checked. Timer UT includes an address counter which, in the course of each frame period, delivers to comparator $CC_1$ the order numbers of the approximately 30 time slots in the frame representing the addresses of the respective channels to which these time slots are assigned. Upon detecting an identity between the addresses appearing at its two inputs, comparator $CC_1$ energizes a control input of register RI which thereupon transmits the byte currently stored therein to code analyzer SM via a line 11.

Section SM comprises a primary register RM and a primary comparator $CC_2$ both connected to line 11 for receiving the selected bytes therefrom. A second input of comparator $CC_2$ is tied to an output line 12 of register RM to allow that comparator to decide whether or not a newly arriving byte has a numerical valve exceeding that of the byte already stored in register RM. In the affirmative case, the new byte is loaded into the register to replace the one previously entered therein. Over a series of successive frames, therefore, the contents of register RM always represent the highest signal level among the digitized samples received from the selected channel. With register RM initially unloaded, i.e. with its contents having a numerical value of zero, the first byte of the series will of course always be entered.

Timing unit UT further includes a frame counter periodically emitting four command pulses $\Phi_1$, $\Phi_2$, $\Phi_3$ and $\Phi_4$ which, besides reaching sections TM and QM of the peak-level detector, also serve to clear the register RM at the end of each n-frame period. With six bits of each byte used for amplitude coding, as is usually the case, there are 64 possible signal levels so that a choice of n=64 offers a good chance that the maximum level will occur at least once in the series.

Data store TM comprises three secondary registers RA, RB and RC with inputs connected in parallel to output line 12 of primary register RM. These inputs, however, are normally blocked and are unblocked only upon the appearance of command pulse $\Phi_1$, $\Phi_2$ or $\Phi_3$ respectively fed to the three secondary registers. Thus, the first register RA is enabled by pulse $\Phi_1$ at the end of the first n-frame series to receive the maximum-amplitude byte entered in register RM during that series. In like manner, the second and third registers RB and RC are respectively enabled by pulses $\Phi_2$ and $\Phi_3$ at the end of the second and the third n-frame period for a transfer to them to the contents of register RM. During a fourth period (which may also last for n frames), therefore, registers RA, RB and RC concurrently store the maximum-amplitude bytes extracted from the selected channel in the three preceding periods.

Identity tester QM comprises three secondary comparators $CC_3$, $CC_4$ and $CC_5$ with inputs connected to respective pairs of secondary registers in data store TM. More particularly, the first comparator $CC_3$ is connected to the outputs of registers RA and RB, the second comparator $CC_4$ is connected to the outputs of registers RB and RC, and the third comparator $CC_5$ is connected to the outputs of registers RC and RA. In response to command pulse $\Phi_4$, fed to control inputs of all three secondary comparators at the end of the fourth n-frame period, each of these comparators determines whether or not the bytes stored in the associated pairs of secondary registers are identical. If the contents of register RB are identical with those of register RA and/or RC, comparators $CC_3$ and/or $CC_4$ respond and, via an OR gate OG, set a three-way electronic switch or multiplexer MT to connect register RB to an output register RU; if there is identity between the contents of registers RA and RC, comparator $CC_5$ sets the switch MT to connect register RC to output register RU. If the contents of all three secondary registers are different from one another, switch MT is set on an input 0 to clear the output register RU without reloading same. During this fourth period, the aforedescribed mode of of operation of primary register RM and comparator $CC_2$ continues ineffectually since register RM is cleared by pulse $\Phi_4$ at the end of this period without transfer of its contents to data store TM. This marks the beginning of a new operating cycle.

Visualizer QN comprises a monitoring display device DV, such as an oscilloscope, controlled by the contents of register RU via a decoder UC. The latter, advantageously, translates the numerical value of the byte stored in register RU into readings of relative power based on a predetermined reference level, the display DV being advantageously graduated in dBmo. An operator can thus directly observe the peak power of the channel signal as digitized by the multiplexer connected to incoming line 10.

With the specific numerical values referred to above, a test period giving rise to a new reading on display DV measures $64 \times 4 \times 125$ $\mu$sec.

Decoder UC may be designed as a read-only memory storing the various dBmo values in 64 cells addressable by a 6-bit group in output register RU. Thus, although reference has been made above to the storage and transfer of bytes, only the amplitude bits of a byte need to be processed in the described manner.

If the signal level displayed by device DV is unsatisfactory, either the encoder individual to the selected channel or the common multiplexer may be at fault. The defect can be readily pinpointed by repeating the test upon switching to another channel.

I claim:

1. In a telecommunication system in which a multiplexer interleaves bit groups from several communication channels, representing digitized signal-amplitude samples, in respective time slots of a recurrent datastream frame individually assigned to said channels, the combination therewith of a peak-level detector comprising:

selection means for extracting bit groups from time slots assigned to a given channel in successive frames of an incoming date stream;

a primary register connected to said selection means for receiving extracted bit groups and temporarily storing same;

primary comparison means with inputs connected to said selection means and to said primary register and with an output connected to a control input of said primary register for enabling same to receive and store only a bit group whose numerical value exceeds that of the current contents of said primary register;

a plurality of secondary registers with normally blocked input connections from said primary register;

timing means synchronized with the recurrence period of said frames for counting several series of successive frames and unblocking the input connection of a respective secondary register at the end of each of said series with resulting transfer of the bit group last stored in each series from said primary register to the respective secondary register;

secondary comparison means with inputs connected to said secondary registers and controlled by said timing means for ascertaining an indentity between at least two bit groups stored in said secondary registers at the end of the last of said series; and evaluation means connected to said secondary comparison means for indicating the numerical value of identical bit groups stored in said secondary registers.

2. The combination defined in claim 1 wherein said selection means comprises an adjustable address selector, an address counter in said timing means identifying the channels to which respective time slots of each frame are assigned, an address comparator with inputs connected to said address selector and said address counter, and an input register temporarily loaded with each incoming bit group, said address comparator commanding the readout of a bit group from said input register to said primary register upon ascertaining a coincidence between the reading of said address counter and the setting of said address selector.

3. The combination defined in claim 2 wherein said selection means further comprises an interface unit delivering the incoming bit groups to said input register and extracting synchronization signals from said data stream for transmission to said timing means.

4. The combination defined in claim 1 wherein said evaluation means comprises a decoder and a visual indicator.

5. The combination defined in claim 4 wherein said decoder is a read-only memory.

6. The combination defined in claim 1, 2, 3, 4 or 5 wherein said secondary registers are a first, a second and a third register, said secondary comparison means comprising a first comparator with inputs connected to said first and second registers, a second comparator with inputs connected to said second and third registers, and a third comparator with inputs connected to said first and third registers, said evaluation means being selectively connectable to at least two of said secondary registers by a switching circuit under the control of said secondary comparison means.

7. The combination defined in claim 6, further comprising an output register inserted between said switching circuit and said evaluation means for storing the contents of a secondary register connected thereto by said switching circuit.

* * * * *